US008744769B1

(12) United States Patent
Bell et al.

(10) Patent No.: US 8,744,769 B1
(45) Date of Patent: Jun. 3, 2014

(54) SYSTEM AND METHODS FOR HEAD UNIT PROVIDING ANALYSIS AND GUIDANCE DURING LONG ROAD TRIPS (71) Applicant: Sprint Communications Company L.P., Overland Park, KS (US)

(72) Inventors: Timothy Robert Bell, Lee's Summit, MO (US); Jonathan M. Bollinger, Lenexa, KS (US); Tae-Woo Cha, Overland Park, KS (US); Janet Kay Price, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/749,676

(22) Filed: Jan. 24, 2013

(51) Int. Cl.
G01C 21/00 (2006.01)
G01C 21/26 (2006.01)
G01C 21/34 (2006.01)

(52) U.S. Cl.
USPC .......................... 701/537; 701/424; 701/411

(58) Field of Classification Search
USPC ......... 701/411, 424, 425, 481, 522, 537–539, 701/414–415, 427, 117–119, 465; 340/539.1, 539.11, 539.13, 539.17, 340/933; 455/39, 41.1, 41.2
See application file for complete search history.

(56) References Cited

U.S. PATENT DOCUMENTS

| 5,406,490 | A | * | 4/1995 | Braegas | 701/414 |
|---|---|---|---|---|---|
| 6,282,475 | B1 | | 8/2001 | Washington | |
| 6,622,087 | B2 | * | 9/2003 | Anderson | 701/423 |
| 6,711,474 | B1 | | 3/2004 | Treyz et al. | |
| 8,068,952 | B2 | | 11/2011 | Valentine et al. | |
| 8,233,919 | B2 | * | 7/2012 | Haag et al. | 455/456.3 |
| 2001/0029425 | A1 | * | 10/2001 | Myr | 701/200 |
| 2002/0082771 | A1 | | 6/2002 | Anderson | |
| 2006/0293040 | A1 | * | 12/2006 | Kortge | 455/418 |
| 2009/0271107 | A1 | * | 10/2009 | Smith | 701/201 |
| 2009/0327508 | A1 | * | 12/2009 | McCarthy et al. | 709/231 |
| 2009/0328116 | A1 | * | 12/2009 | McCarthy et al. | 725/93 |
| 2010/0285787 | A1 | * | 11/2010 | Matsuda | 455/418 |
| 2011/0004401 | A1 | * | 1/2011 | Rothschild | 701/201 |
| 2011/0035139 | A1 | * | 2/2011 | Konlditslotis et al. | 701/119 |
| 2011/0213787 | A1 | * | 9/2011 | Cerny | 707/749 |
| 2011/0301839 | A1 | * | 12/2011 | Pudar et al. | 701/202 |
| 2012/0065872 | A1 | * | 3/2012 | Nortrup | 701/118 |
| 2012/0197484 | A1 | | 8/2012 | Nath et al. | |
| 2012/0282908 | A1 | * | 11/2012 | Nicolini | 455/418 |
| 2013/0054134 | A1 | * | 2/2013 | Wang et al. | 701/424 |
| 2013/0073201 | A1 | * | 3/2013 | Coughlin et al. | 701/465 |

(Continued)

OTHER PUBLICATIONS

Bell, Timothy Robert, et al., Patent Application entitled "System and Method for Calculating Multi-User Vehicle Usage," filed Nov. 13, 2013, U.S. Appl. No. 13/675,946.

*Primary Examiner* — Mary Cheung
*Assistant Examiner* — Rodney Butler (57) ABSTRACT

Embodiments relate generally to devices and methods for analyzing trip information and providing suggestions and information to a user based on the analysis involving the head unit of a vehicle. Analysis may comprise creating a user profile based on activity of a user of the vehicle, wherein the user may be identified by connection with a mobile device associated with the user. The user profile may then be used to determine suggestions or warnings for a user based on current trip information. Analysis may also comprise receiving weather and/or traffic information corresponding to the trip information and determining suggestions or warning for a user based on the effects of the weather and/or traffic.

20 Claims, 7 Drawing Sheets

(56) References Cited

U.S. PATENT DOCUMENTS

| | | |
|---|---|---|
| 2013/0086518 A1* | 4/2013 | Park et al. .................... 715/808 |
| 2013/0106750 A1* | 5/2013 | Kurosawa .................... 345/173 |
| 2013/0116882 A1* | 5/2013 | Link et al. .................... 701/31.4 |
| 2013/0151088 A1* | 6/2013 | Ricci ............................ 701/51 |
| 2013/0157647 A1* | 6/2013 | Kolodziej .................... 455/419 |
| 2013/0281021 A1* | 10/2013 | Palin et al. .................. 455/41.2 |
| 2013/0289859 A1* | 10/2013 | Kim ............................. 701/117 |
| 2013/0317862 A1* | 11/2013 | Fernandes et al. ............ 705/4 |
| 2013/0346124 A1* | 12/2013 | Stern et al. .................... 705/6 |

* cited by examiner

SYSTEM AND METHODS FOR HEAD UNIT PROVIDING ANALYSIS AND GUIDANCE DURING LONG ROAD TRIPS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles may now provide wireless communications based functionality. In an embodiment, a head unit may be installed in a motor vehicle that provides a variety of functionality that depends at least partly on wireless communications connectivity via a cellular network. For example, the head unit of a vehicle may be operable to communicate (wirelessly and/or via a cable or wire connection) with one or more mobile devices within the vehicle, allowing for information transfer between the head unit and mobile device(s). Additionally, some motor vehicles and/or head units may be equipped with a navigation system, which may be operable to provide directions, travel information, and information regarding restaurants, lodging, gas stations, tourist stops, among other things.

SUMMARY

In an embodiment, an in-vehicle head unit is disclosed. The in-vehicle head unit comprises one or more of the following: a processor; a short-range radio transceiver operable to establish a communication link to at least one mobile device; a non-transitory memory; and an application stored in the non-transitory memory that, when executed by the processor, identifies a user based on the identity of the at least one mobile device, receives trip information from the user, monitors information about the activity of the vehicle, associates monitored activity of the vehicle with the user of the mobile device, and suggests activity to the user based on the received trip information and the monitored activity of the vehicle associated with the user.

In an embodiment, a method for long trip analysis by a head unit in a vehicle is disclosed. The method comprises: establishing a communication link with a mobile device, wherein the mobile device is associated with a user of the vehicle; monitoring the activity of the vehicle; associating the monitored activity with the mobile device; receiving trip information from a user; analyzing the trip information and the monitored activity; and making suggestions to the user based on the analysis.

In an embodiment, a method for long trip analysis by a head unit in a vehicle is disclosed. The method comprises: receiving trip information from a user; analyzing the trip information; receiving weather and traffic information corresponding to the trip information; and determining travel route and arrival time based on weather and traffic information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for analyzing trip information involving an in-vehicle head unit (or computer system). Trip information may comprise one or more of destination, time frames, preferred routes, preferred stops, and lodging information, among other things, and may be communicated to the head unit by a user of the vehicle, for example before beginning a long road trip. Analysis may comprise monitoring the activity of a user of the vehicle, wherein the head unit may communicate with a mobile device associated with the user where the head unit may identify one or more user by the communicatively coupled mobile device(s). For example, the head unit may monitor the stopping frequency, preferred stop locations, and/or purpose for stops as well as other activity of the vehicle (particularly in a long road trip situation) and may build a user profile of this information associated with the coupled mobile device(s). The user profile may be stored in the memory of the head unit, and multiple user profiles associated with different users (or different combinations of users) may be compiled and stored in the memory. Alternatively, the user profile may be communicated to and stored on the mobile device, or the user profile may be communicated to and stored on a network server or database and accessed by the mobile device and/or head unit. The user profile(s) may be accessed and analyzed by the head unit to provide suggestions to a user based on current trip information. For example, the head unit may compare the preferred frequency of stops in the user profile with the availability of locations in the current route and make suggestions to the user on when and where to stop.

Analysis may also comprise receiving weather and/or traffic information associated with or corresponding to the trip information provided by the user, for example a route input by the user. The effect of the weather and/or traffic information on the trip analysis may be determined, wherein weather and/or traffic may cause a delay in estimated travel time. The weather and traffic information may be current and/or predicted. Suggestions may be made to the user based on the weather/traffic, such as a change in route to avoid the weather and/or traffic or a change in final destination for a particular day. For example, it may be suggested that a user stop for the night before reaching a bad storm, or a different driving route may be suggested to avoid weather/traffic. Also, it might be determined that driving through an area with weather and/or traffic that may cause a delay will delay the user's arrival time at a place of lodging, and a suggestion to change lodging to a closer location may be made.

Analysis as described above may be completed by an application stored in the memory of the head unit. The application may communicate with the user profile(s) stored in the memory as well as other applications, such as a navigation system and weather and traffic providers, for example. The application may be executed by a processor in the head unit and may communicate with a user of the vehicle via a user interface.

Figure 1:
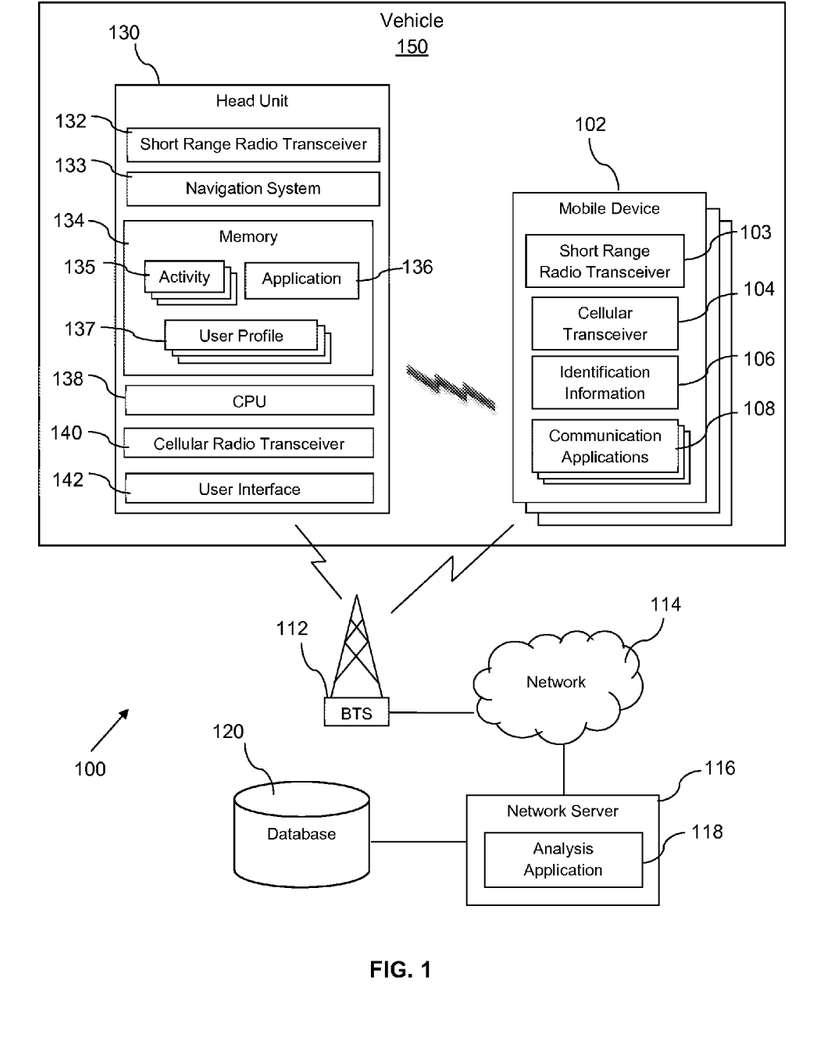
FIG. 1 is an illustration of a communication system according to an embodiment of the disclosure.

Turning now to FIG. 1, a communication system 100 is described. In an embodiment, the system 100 comprises one or more mobile communication device 102. The device 102 may comprise a short range radio transceiver 103, a cellular transceiver 104, identification information 106, and a plurality of communication applications 108. The device 102 may be configured to use the cellular transceiver 104 to establish a wireless communication link with a base transceiver station (BTS) 112, and the base transceiver station 112 provides communications connectivity of the device 102 to a network 114. The network 114 may comprise any combination of private and public networks.

It is understood that the system 100 may comprise any number of mobile communication devices 102 and any number of base transceiver stations 112. The collectivity of base transceiver stations 112 may be said to comprise a radio access network, in that these base transceiver stations 112 may provide radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102. As shown in FIG. 1, the system 100 may comprise a network server 116 and a database 120 in communication with the network server 116. In an embodiment, the network server 116 may comprise an analysis application 118 wherein information received from the head unit 130 and/or the mobile device 102 may be analyzed and stored by the analysis application 118 of the network server 116.

The cellular transceiver 104 of the mobile device 102 may communicate with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The communication applications 108 of the mobile device 102 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory area of the mobile communication device 102.

The system 100 may also comprise a vehicle 150, wherein the vehicle 150 may be any of an automobile or car, a sports utility vehicle (SUV), a pick-up truck, a mini-van, a van, a truck, a delivery truck, a tractor of a tractor-trailer or "18-wheeler" combination, or other motorized vehicle. The vehicle 150 may comprise a head unit 130 installed that provides a centralized electronic communication capability. The head unit 130 (also known as an in-vehicle computer system and/or a telematics unit) may be operable to communicate with the one or more mobile devices 102 using a short range radio transceiver 132 of the head unit 130 and a short range radio transceiver 103 of the mobile device 102. The head unit 130 may communicate with the mobile device 102 using any of a variety of wireless communication protocols, for example a WiFi radio transceiver, a Bluetooth® radio transceiver, a ZigBee® radio transceiver, a near-field-communication (NFC) radio transceiver, and/or other radio transceivers.

As shown in FIG. 1, the one or more mobile devices 102 may be located within the vehicle 150 when in communication with the head unit 130. The head unit 130 may also comprise an optional navigation system 133, a non-transitory memory 134, a processor 138, an optional cellular radio transceiver 140, and an optional user interface 142, wherein the optional cellular radio transceiver 140 may provide communication with the base transceiver station 112. In an embodiment, the cellular radio transceiver 140 may be located within the head unit 130, while in other embodiments, the cellular radio transceiver 140 may be located elsewhere within the vehicle 150, in communication with the head unit 130.

The non-transitory memory 134 of the head unit 130 may comprise an application 136 that, when executed by the processor 138, may receive or infer information such as indications of the activity 135 of the vehicle. Activity 135 may include number of stops made, frequency of stops, duration of stops, location of stops, purpose of stops (such as food, gas, tourism, or lodging, for example). In some embodiments, activity information may be at least partially provided by a navigation system 133 in the vehicle 150. In an embodiment, the application 136 may receive location information from the navigation system 133 and may also monitor time frames of activity. The activity 135 information provided by the navigation system 133 may comprise stored or recorded information about events or actions that have occurred, for example information about location of stops completed, duration of stops completed, purpose of the stops, speed travelled over one or more completed segments of the road trip, and preferred route. In some embodiments, activity 135 may be received from sensors within the vehicle and stored in the memory 134 of the head unit 130. The sensors may provide indications of one or more of the following: miles travelled, gas used, level of gas in vehicle, speed, tire wear, oil use, brake use, acceleration, deceleration, temperature, use of windshield wipers, lateral movement of shocks, motion detection, engine fail, and impact detection. In some embodiments, the sensors may be in communication with a CAN bus, wherein the CAN bus may communicate the information received from the sensors to the head unit 130. Additionally, the application 136 may receive information from the user, possibly via the user interface 142, concerning activity 135 and preferences.

The user interface 142 of the head unit 130 may, in some embodiments, comprise a display, an input system, a speaker system, and a microphone. In some embodiments, the display may comprise a screen, and the input system may comprise a keypad and/or a touch screen, for example. The speaker system may communicate audio (such as media or messages) to a user of the vehicle. The microphone may receive voice commands or messages from a user of the vehicle and may, in some embodiments, communicate voice commands from the user to the application 136.

The identification information 106 of the mobile device 102 may be communicated to the head unit 130, wherein the application 136 may receive the identification information 106 of the mobile device 102 and may associate the identification information 106 with the activity 135 received by the application 136 while the head unit 130 is communicatively coupled to the mobile device 102. In other words, the application 136 may monitor the time when the mobile device 102 couples with (and/or uncouples from) the head unit 130 as well as the time associated with the stored activity 135 and then associate the identification information 106 of the mobile device 102 with the activity 135 that occurs during the time that the mobile device 102 is in communication with the head unit 130.

In some embodiments, the application 136 may create a user profile 137 associated with the identification information 106 of the mobile device 102 (and therefore the user of the mobile device 102) which may, in some embodiments, be stored in the memory 134. In other embodiments, the user profile 137 may be communicated to and stored on the mobile device 102, wherein the mobile device 102 may couple with any number of head units 130 and may communicate the user profile to a coupled head unit 130. Alternatively, the user profile 137 may be communicated to and stored on a network server 116 or database 120, wherein the user profile 137 may be communicated to a mobile device 102 and/or head unit 130 in communication with the mobile device 102. In some embodiments, the user profile 137 may be communicated to multiple vehicles 150 used by the user of the mobile device 102, wherein the user profile 137 remains associated with the mobile device 102. It is understood that the information of the user profile(s) 137 may be personalized and may vary from user to user. A user profile 137 may comprise information from various sources including the activity 135 stored on the head unit 130, which may include driving activity, purchasing activity, and/or internet activity. Additionally, a user may input profile information and preferences to the user profile 137 via the user interface 142 of the head unit 130 and/or via wireless communication with the head unit 130.

In some embodiments, a user profile 137 may be associated with the identification information 106 of multiple mobile devices 102, such as a driver and multiple passengers, and may be different than a user profile 137 associated with only one of the multiple mobile devices 102. As an example, one driver may prefer to stop approximately every 3 hours when driving alone, but may prefer to stop approximately every 2 hours when driving with a particular passenger or passengers. Additionally, a driver may prefer to stop at certain restaurants when driving alone, but may prefer more child-friendly restaurants when driving with a family, for example.

In an embodiment, the application 136 may receive trip information from the user before the vehicle is to be used for a trip, wherein the trip information may be communicated directly to the application 136 and/or it may be received by the application 136 from reservation activity or transactions with vendors, such as hotels, restaurants, etc. The application 136 may, in some embodiments, combine the trip information with other sources of information as well as the user profile 137 created by application 136, and may make inferences for use in further analysis and/or make suggestions to the user based on this combination. Sources of information accessible to the application 136 may include current map data of roads, information for restaurants, bathrooms, hotels, gas stations, and other places of interest, as well as information for hours, menus, and options for potential stopping points. For example, the user profile 137 may indicate that a user prefers to stop approximately every two hours (for a restroom break, food break, or gas fill-up, for example), but the application may note that the vehicle 150 is about to enter an area where there will not be any stopping points (wherein the stopping points may be associated with a particular purpose for stopping) at or around the two hour mark. The application 136 may then suggest that the user stop prior to the two hour mark and/or warn the user than an upcoming location may be the last location for a period of time past the two hour mark.

Additionally, the user profile 137 may indicate that a user prefers to stop at a particular restaurant or other type of location, and the application 136 may notice that an upcoming restaurant or location is the last one for a period of time or a particular distance of the current trip. The application 136 may then suggest that the user stop at the upcoming location. Also, the application 136 may access or receive information regarding operating hours of a stopping point and may communicate this information to a user. For example, the application 136 may notice that a preferred restaurant or store may be closing soon, or may have unusual hours (such as during holidays for example) and may notify the user that the restaurant or store may not be available.

Additionally, the application 136 may have access to weather and traffic information, which may also be used in making inferences used for further analysis and/or used when determining suggestions to be made to the user. For example, the application 136 may receive weather and/or traffic information associated with or corresponding to the trip information. In some embodiments, the application 136 may receive the weather and traffic information via the cellular radio transceiver 140. In another embodiment, the navigation system 133 may communicate the weather and/or traffic information to the application 136. Additionally, a decrease in the speed of driving (due to weather or traffic) may be sensed by the vehicle 150, wherein sensors in the vehicle 150 may provide indication of precipitation as well. The application 136 may analyze the received trip information and provide suggestions for the user based on the weather and traffic information, wherein the weather and/or traffic may affect the route, travel time, and/or other aspects of the trip.

As an example, the application 136 may suggest a change of driving route based on a received traffic or weather event. In another example, the application 136 may suggest a change of lodging plan based on a detected change in travel time caused by traffic or weather conditions. For example, the application 136 may project or estimate that a user will not reach a planned location of lodging until very late at night because of the delay caused by weather and/or traffic. The application 136 may then suggest to the user that they change the lodging reservations to a closer location and may also communicate cancellation deadlines to the user. Analysis of weather and traffic information may also prompt the application 136 to make suggestions about other stopping points based on the change in travel time, such as gas stations, restaurants, and/or stores. For example, the decrease in speed may result in stopping for gas after driving fewer miles or stopping to use a restroom after traveling fewer miles and/or using less gasoline than originally planned (or inferred by the application 136), wherein the application 136 may notify the user of this change and suggest one or more locations to stop.

Figure 2:
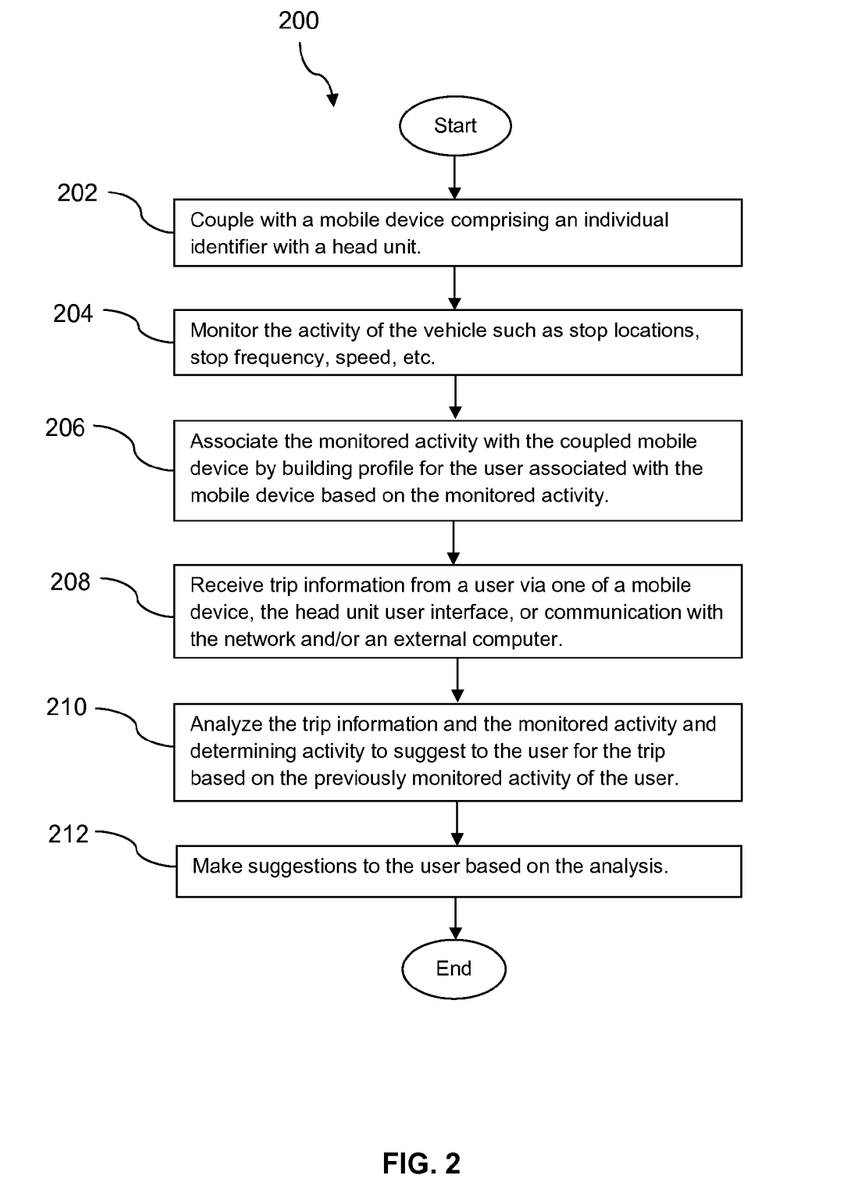
FIG. 2 is a flow chart illustrating a method according to an embodiment of the disclosure.

Turning now to FIG. 2, a method 200 is described. At block 202, the method 200 may comprise communicatively coupling the head unit in a vehicle with a mobile device comprising an individual identifier, wherein the individual identifier of the mobile device may be associated with a user of the vehicle. At block 204, the method may comprise monitoring the activity of the vehicle such as stop locations, stop frequency, speed, etc. wherein the monitoring may be done by an application in the head unit. At block 206, the method may further comprise associating the monitored activity of the user with the coupled mobile device by building a profile for the user associated with the mobile device based on the monitored activity. At block 208, the method may comprise receiving trip information from a user via one of a mobile device, the head unit user interface, or communication with the network and/or an external computer. Then, at block 210, the method may comprise analyzing the trip information and the monitored activity and determining activity to suggest to the user for the trip based on the previously monitored activity of the user. At block 212, the method may comprise providing suggestions to the user based on the analysis, wherein the suggestions may be communicated to the user via a user interface. In an embodiment, the suggestions may comprise a change in driving route, stopping location, and/or lodging reservation based on the previously monitored activity of the user as well as weather and traffic information. In an embodiment, the above steps of the method 200 may be performed or completed by the head unit of a vehicle and/or an application stored in the head unit.

Figure 3:
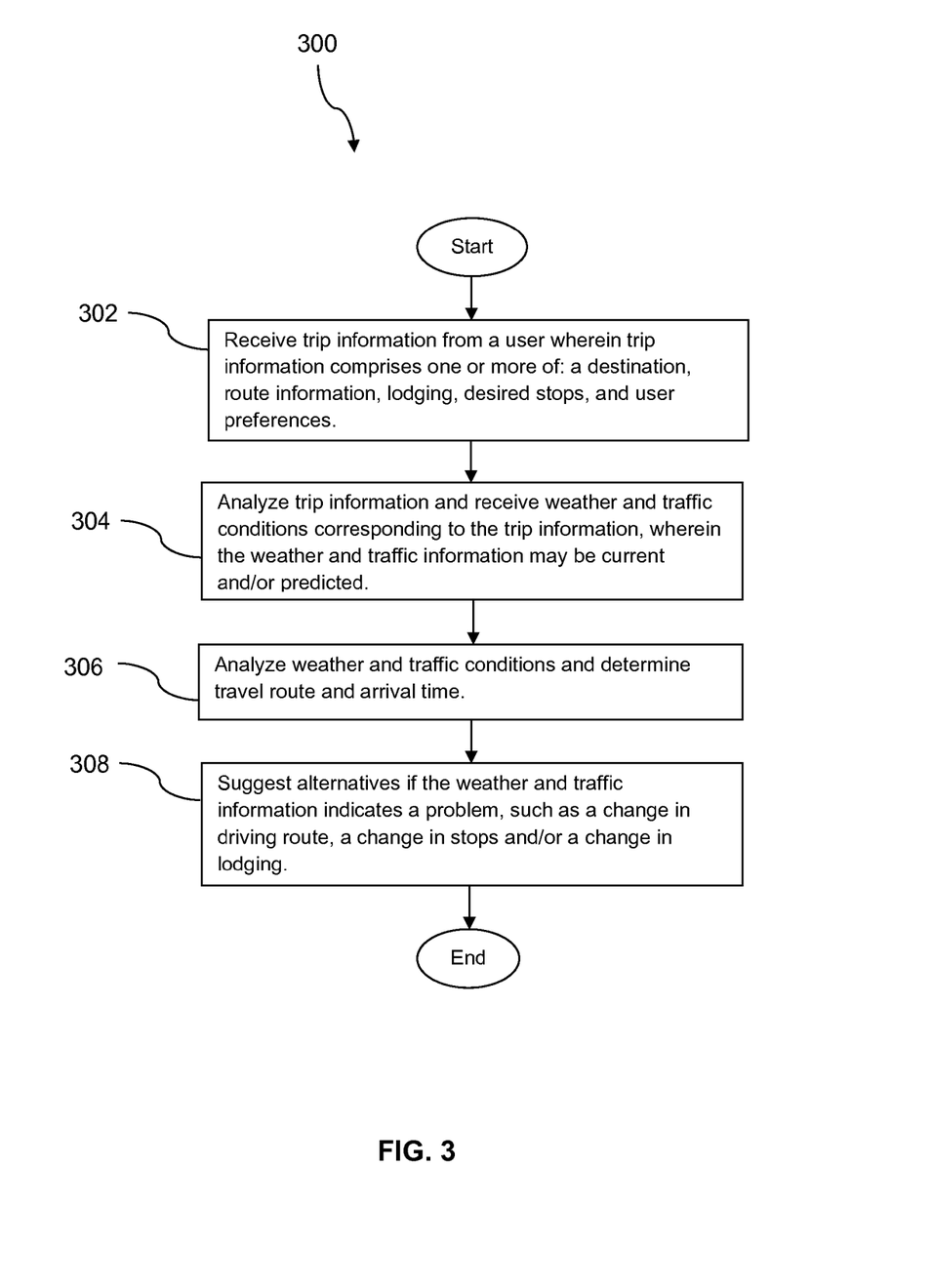
FIG. 3 is a flow chart illustrating another method according to an embodiment of the disclosure.

Turning now to FIG. 3, a method 300 is described. At block 302, the method 300 may comprise receiving trip information from a user wherein trip information may comprise one or more of: a destination, route information, lodging, desired stops, and user preferences. In an embodiment, an application stored in the memory of the head unit in a vehicle may receive the trip information. At block 304, the method 300 may comprise analyzing the received trip information and receiving weather and traffic conditions that correspond to the trip information, wherein the weather and traffic information may be current and/or predicted. At block 306, the method 300 may comprise analyzing the weather and traffic conditions received at block 304 and determining the travel route and arrival time based on the weather and traffic conditions. Then, at block 308, the method 300 may comprise suggesting alternatives to the user if the weather and traffic information analyzed at block 306 indicates a problem or delay, such as a change in driving route, a change in stops and/or a change in lodging. In an embodiment, the above steps of the method 300 may be performed or completed by the head unit of a vehicle and/or an application stored in the head unit.

Figure 4:
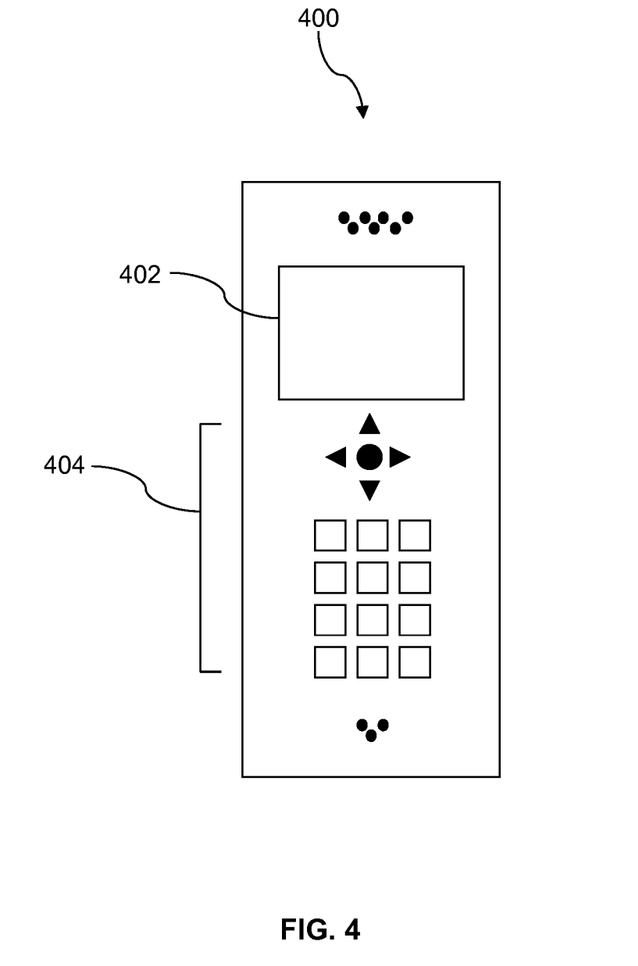
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
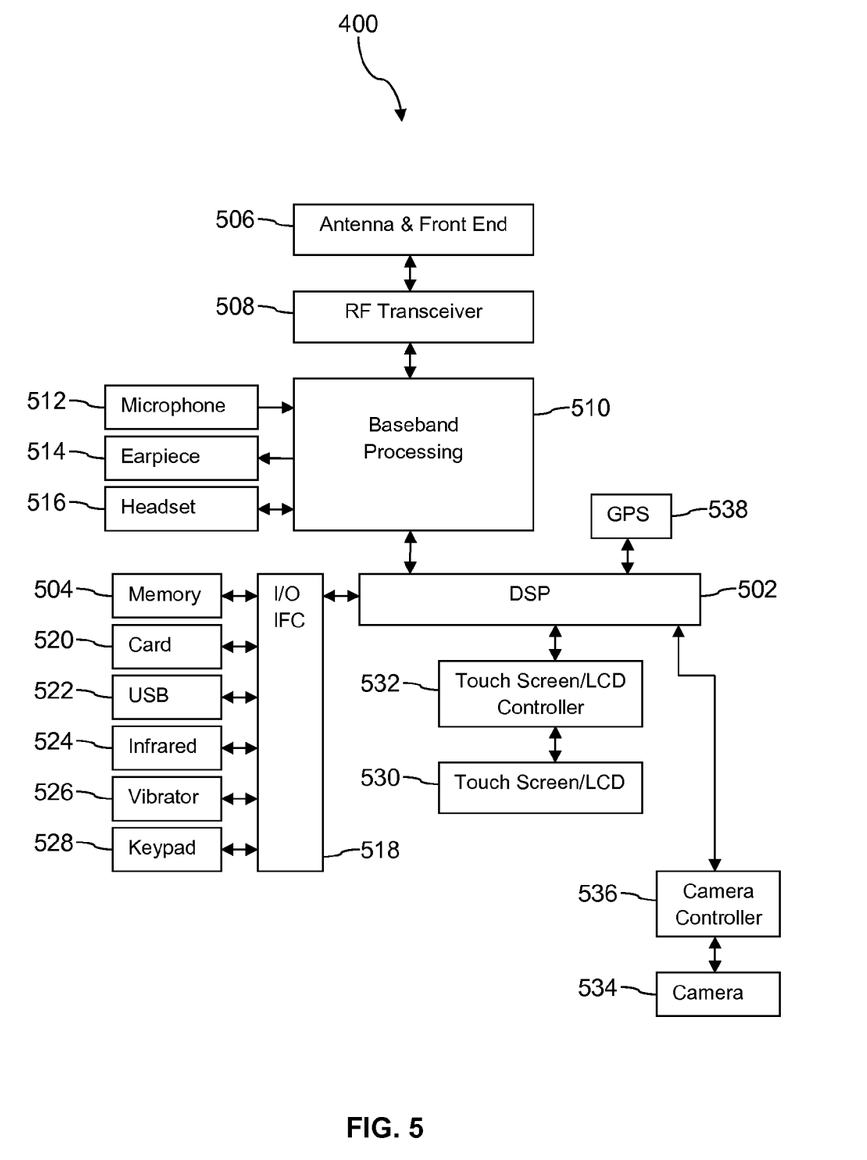
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
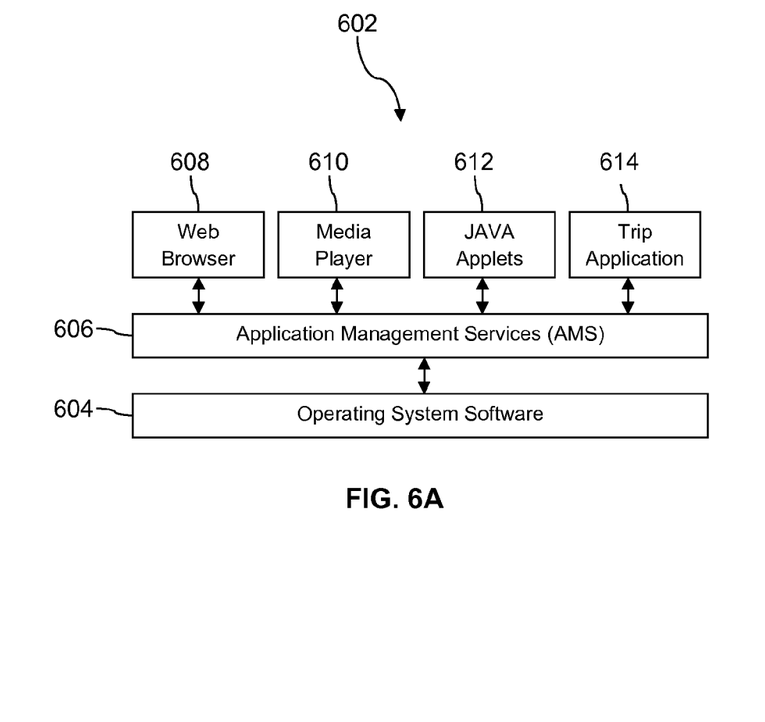
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612 and a trip application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The trip application 614 may be substantially similar to the application 136 as described above in FIG. 1.

Figure 6B:
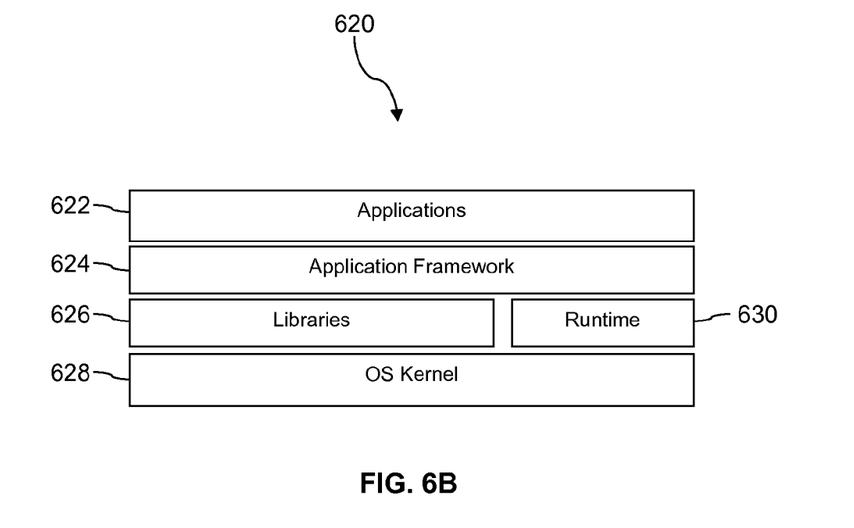
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
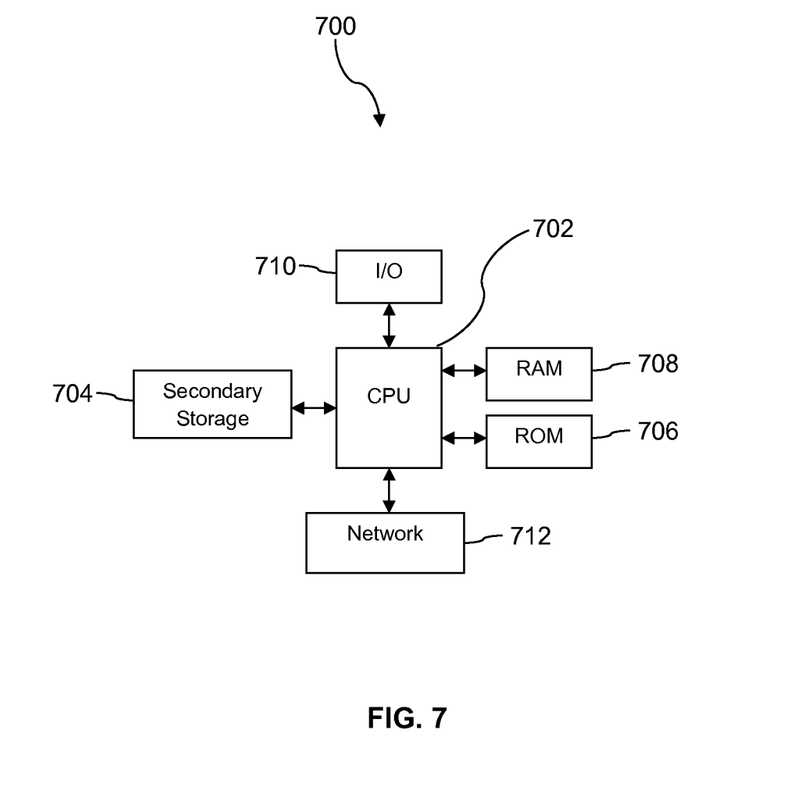
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An in-vehicle head unit comprising:
 a processor;
 a short-range radio transceiver operable to establish a communication link to at least one mobile device;
 a non-transitory memory; and
 an application stored in the non-transitory memory that, when executed by the processor,
  monitors information about the activity of the vehicle during a previous trip, wherein at least some of the information about the activity of the vehicle during the previous trip is received from a plurality of sensors associated with the vehicle, and wherein at least one sensor of the plurality of sensors associated with the vehicle indicates at least one of tire wear, oil use, brake use, use of windshield wipers, lateral movement of shocks, motion detection, engine fail, or impact detection,
  associates the activity of the vehicle during the previous trip that is monitored while the at least one mobile device is coupled to the in-vehicle head unit with a user of the at least one mobile device,
  identifies the user based on an identity of the at least one mobile device,
  receives trip information about a current trip from the user,
  monitors information about the activity of the vehicle during the current trip,
  associates the activity of the vehicle during the current trip that is monitored while the at least one mobile device is coupled to the in-vehicle head unit with the user of the at least one mobile device, and
  makes suggestions to the user during the current trip based on combining the monitored activity of the vehicle during the previous trip associated with the user, the received trip information, and the monitored activity of the vehicle during the current trip associated with the user, wherein the suggestions comprise at least one of an upcoming stopping point or a change in reservations.

2. The in-vehicle head unit of claim 1 further comprising a user interface, wherein the application communicates with the user via the user interface.

3. The in-vehicle head unit of claim 2, wherein the user interface comprises one or more of: a display, an input system, a speaker system, and a microphone.

4. The in-vehicle head unit of claim 2, wherein the user may communicate preference information to the application via one or more of: the user interface of the in-vehicle head unit, the at least one mobile device, an external computer.

5. The in-vehicle head unit of claim 1, wherein the application receives weather and traffic information, determines predicted travel time based in part on the received weather and traffic information, and makes suggestions based on the received weather and traffic information.

6. The in-vehicle head unit of claim 5, wherein the application suggests a change of driving route based on the received traffic or weather information.

7. The in-vehicle head unit of claim 5, wherein the application suggests a change of lodging plan based on a detected change in travel time caused by traffic or weather conditions.

8. The in-vehicle head unit of claim 1 further comprising a cellular transceiver operable to communicate with a base transceiver station, wherein the in-vehicle head unit receives the trip information via communication with the base transceiver station.

9. The in-vehicle head unit of claim 1, wherein the in-vehicle head unit receives the trip information via communication with the at least one mobile device.

10. The in-vehicle head unit of claim 1 further comprising a user interface, wherein the in-vehicle head unit receives the trip information via input to the in-vehicle head unit via the user interface.

11. A method for long trip analysis by a head unit in a vehicle comprising:
 establishing, by the head unit, a communication link with a mobile device, wherein the mobile device is associated with a user of the vehicle;
 monitoring, by the head unit, the activity of the vehicle during a previous trip and a current trip, wherein at least some of the information about the activity of the vehicle during at least one of the previous trip or the current trip is received from a plurality of sensors associated with the vehicle, and wherein at least one sensor of the plurality of sensors associated with the vehicle indicates at least one of tire wear, oil use, brake use, use of windshield wipers, lateral movement of shocks, motion detection, engine fail, or impact detection;
 associating, by the head unit, the activity of the vehicle during the previous trip and during the current trip that is monitored while the mobile device is coupled to the head unit with the user of the mobile device;
 receiving, by the head unit, trip information about the current trip from the user;
 analyzing, by the head unit, the trip information and the monitored activity of the vehicle during the previous trip and the current trip associated with the user; and
 making, by the head unit, suggestions to the user based on the analysis, wherein the suggestions comprise at least one of an upcoming stopping point or a change in reservations.

12. The method of claim 11, wherein associating the activity of the vehicle during the previous trip and the current trip with the user of the mobile device comprises building a user profile associated with the mobile device based on the monitored activity.

13. The method of claim 12, wherein the user profile comprises one or more of: frequency of stops, purpose of stops, and preferred locations to stop.

14. The method of claim 11, wherein receiving the trip information from the user comprises receiving one or more of: a destination, route information, lodging, desired stops, and user preferences.

15. A method for analyzing trip information by a head unit in a vehicle comprising:
 monitoring, by the head unit, the activity of the vehicle during a previous trip and a current trip, wherein at least some of the information about the activity of the vehicle during at least one of the previous trip or the current trip is received from a plurality of sensors associated with the vehicle, and wherein at least one sensor of the plurality of sensors associated with the vehicle indicates at least one of tire wear, oil use, brake use, use of windshield wipers, lateral movement of shocks, motion detection, engine fail, or impact detection;
 associating, by the head unit, the activity of the vehicle during the previous trip and the current trip that is monitored while a mobile device is coupled to the head unit with a user of the mobile device;

receiving, by the head unit, trip information about the current trip from the user of the mobile device;

analyzing, by the head unit, the trip information and the monitored activity of the vehicle during the previous trip and the current trip associated with the user to determine one or more of: predicted stops, travel time, or travel route;

receiving, by the head unit, weather and traffic information corresponding to the trip information; and altering, by the head unit, analysis of the trip information and the monitored activity of the vehicle during the previous trip and the current trip associated with the user based on the weather and traffic information.

16. The method of claim 15 further comprising suggesting alternatives when the weather and traffic information indicates a problem.

17. The method of claim 16, wherein a suggested alternative comprises a change in driving route.

18. The method of claim 16, wherein a suggested alternative comprises a change in lodging.

19. The method of claim 15, wherein receiving the trip information from the user comprises receiving one or more of: a destination, route information, lodging, desired stops, and user preferences.

20. The in-vehicle head unit of claim 1, wherein each of the previously monitored activity of the vehicle during the previous trip and the monitored activity of the vehicle during the current trip comprises at least one of number of stops made, frequency of stops, duration of stops, location of stops, purpose of stops.

* * * * *